Oct. 13, 1964  A. H. KLITTEN  3,153,216
WINDING ARRANGEMENT FOR ELECTRICAL INDUCTIVE APPARATUS
Filed Aug. 11, 1958  2 Sheets-Sheet 1

INVENTOR
Aage H. Klitten
BY
F. E. Browder
ATTORNEY

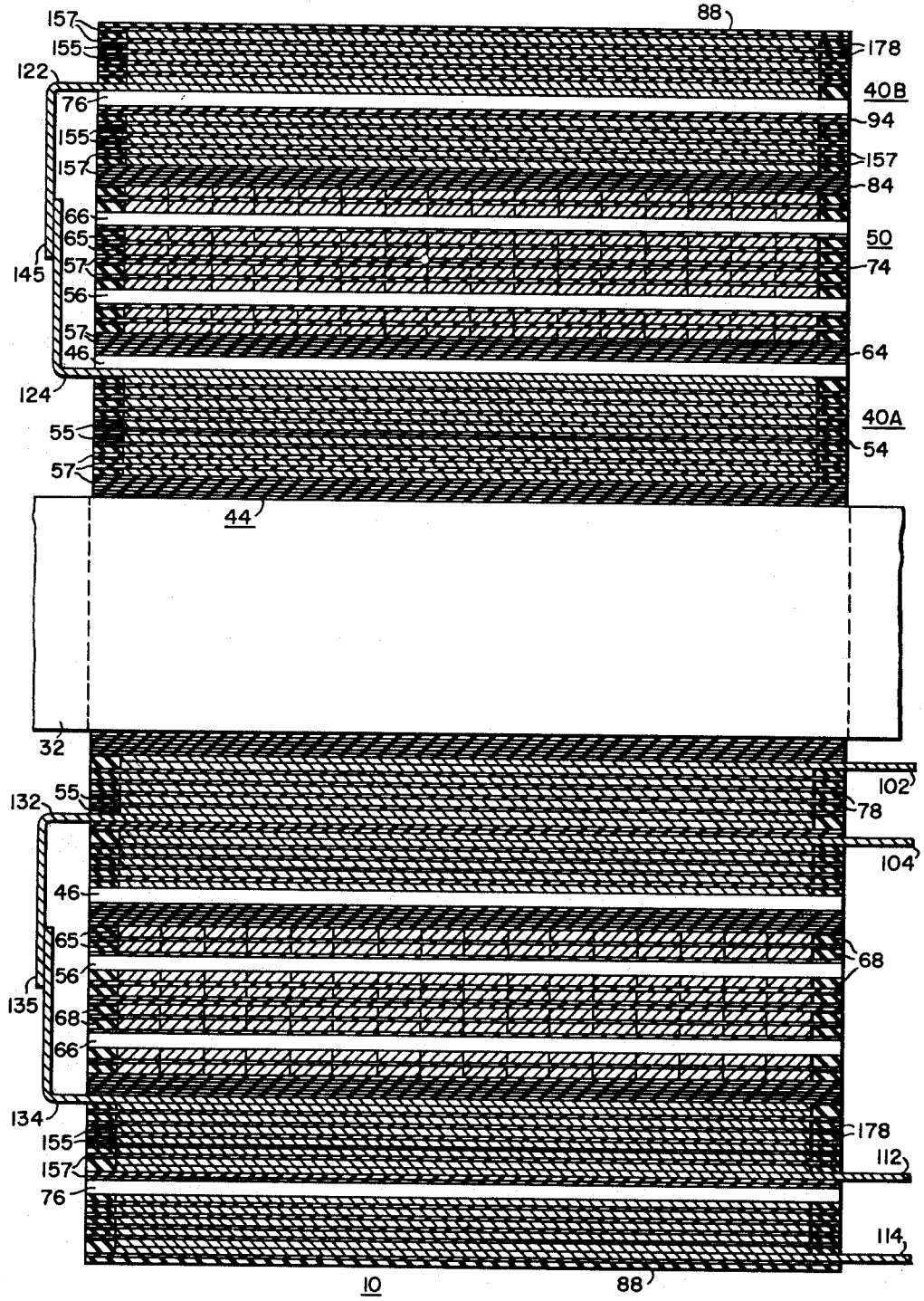

United States Patent Office 3,153,216
Patented Oct. 13, 1964

3,153,216
WINDING ARRANGEMENT FOR ELECTRICAL
INDUCTIVE APPARATUS
Aage H. Klitten, Hickory Township, Mercer County, Pa., assignor to Westinghouse Electric Corporation, East Pittsburgh, Pa., a corporation of Pennsylvania
Filed Aug. 11, 1958, Ser. No. 754,285
3 Claims. (Cl. 336—223)

This invention relates to electrical inductive apparatus such as transformers and more particularly to windings for such apparatus.

In certain types of electrical inductive apparatus, such as transformers, having a plurality of windings, it is sometimes desirable to form one or more of the windings from conducting sheet or strip material. In known types of transformers including a winding formed from conducting sheet material, problems arise in providing the necessary mechanical strength in such a winding and in making the lead connections to the winding. It is therefore desirable to provide an improved winding construction for electrical inductive apparatus, such as transformers, which includes at least one winding formed from conducting strip material and which is lighter in weight and more compact than a conventional transformer of the same general type having windings formed from conducting strap material rather than strip material.

It is an object of this invention to provide a new and improved winding construction for electrical inductive apparatus, such as transformers.

It is another object of this invention to provide a new and improved transformer including a plurality of windings disposed on a magnetic core, at least one of said windings being wound or formed from conducting sheet material.

It is also an object of this invention to provide a transformer including a core and coil assembly which is more compact and lighter in weight than a conventional transformer of the same type.

A further object of this invention is to provide a unitary winding assembly including a plurality of windings for a transformer, at least one of said windings being wound from conducting strip or sheet material.

A more specific object of this invention is to provide a transformer core and coil assembly including a plurality of windings disposed on a magnetic core, at least one of said windings being formed from conducting strip material, and including lead means connected to said winding formed from conducting strip material.

Other objects of this invention will, in part, be obvious and will, in part, appear hereinafter.

For a fuller understanding of the nature and objects of the invention, reference should be had to the following detailed description taken in connection with the accompanying drawings, in which:

FIG. 2 is a partial side elevational view, in section, illustrating in greater detail the transformer core and coil assembly shown in FIG. 1;

Figure 1:
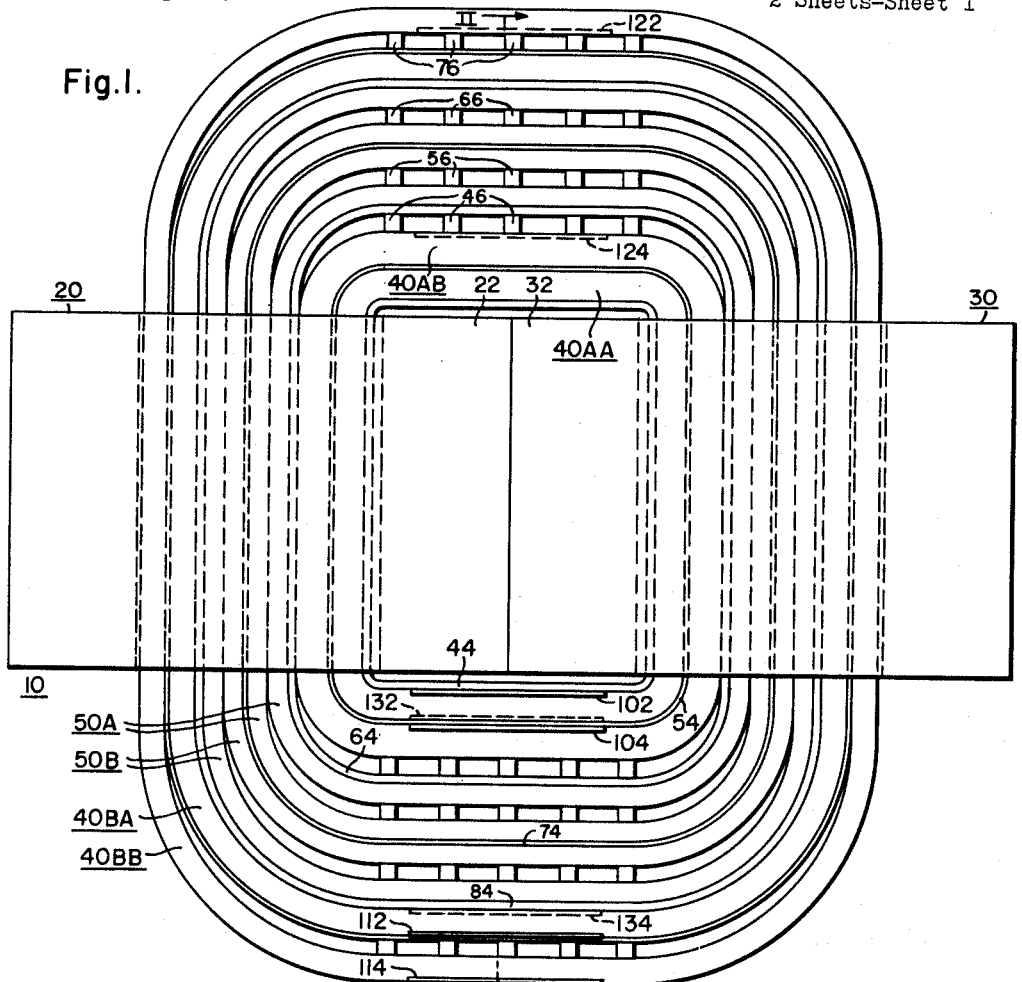
FIGURE 1 is a simplified top plan view of a transformer core and coil assembly incorporating the teachings of this invention.

Referring now to the drawing and FIGS. 1 and 2 in particular, there is illustrated a transformer core and coil assembly 10 embodying the teachings of this invention. In general, the transformer core and coil assembly 10 comprises a first winding 40 including the first and second winding sections 40A and 40B, a second winding 50 and the magnetic core members 20 and 30 on which the winding sections 40A and 40B and the second winding 50 are inductively disposed. The magnetic core members 20 and 30 together form a magnetic core means of the shell form type including the winding leg members 22 and 32 respectively on which the winding sections 40A and 40B and the second winding 50 are inductively disposed. The second winding 50 is inductively disposed intermediate the first and second winding sections 40A and 40B respectively of the first winding 40 in order to provide an interleaved construction.

In particular, the first or inner winding section 40A of the first winding 40 includes an inner winding portion 40AA and an outer winding portion 40AB, each including a plurality of turns of a conducting strip material 55 spirally wound together with a first layer of insulation 57 around the winding leg members 22 and 32 of the magnetic core members 20 and 30 respectively. A supporting or coil-form member 44, which is tubular in shape, is disposed between the first winding section 40A and the winding leg members 22 and 32 to insulate the winding section 40A from the core members 20 and 30 and to provide supporting means on which the turns of the winding section 40A may be wound. The supporting member 44 includes a plurality of spirally wound turns of the first layer of insulation 57 and is preferably wound on a separate mandrel (not shown) of a suitable shape. The inner and outer winding portions 40AA and 40AB of the first winding section 40A are insulated from each other by an insulating member 54 which comprises a plurality of spirally wound turns of the first layer of insulation 57. In order to provide additional creep insulation between the turns of the first winding section 40A at the edges of the respective turns, suitable insulating collar members 78 may be provided. Since the longitudinal or vertical width dimension of the conducting sheet material 55 is preferably less than that of the first layer of insulation 57, the collar members 78 also maintain the spacing between the turns of the first layer of insulation 57 of the first winding section 40A and may be conveniently formed by crimping or folding the edges of the first layer of insulation 57 several times.

Referring to FIG. 2, a starting lead 102 is brazed or connected to the inner end or turn of the conducting sheet material 55 from which the inner winding portion 40AA of the first winding section 40A is formed. A finish lead 132 is brazed or connected to the outer turn of the inner winding portion 40AA of the first winding section 40A. Similarly, a starting lead 104 and a finish lead 124 are brazed or connected to the inner and outer ends or turns of the conducting sheet material 55 from which the outer winding portion 40AB of the first winding section 40A is formed.

In order to provide winding-to-winding insulation between the first winding section 40A and the second winding 50, the duct-forming or spacing members 46 are disposed in spaced relation adjacent to the outermost turns of the first winding section 40A as shown in FIGS. 1 and 2. The duct-forming members 46 are formed from a suitable insulating material, such as wood, and are disposed only at the ends of the winding section 40 in order to provide cooling ducts through which a fluid dielectric may flow for more efficient cooling of the transformer core and coil assembly 10. The winding-to-winding insulation 64 comprises a plurality of spirally wound turns of the first layer of insulation 57, the plurality of turns being wound directly over the duct forming members 46 and the outermost turns of the first winding section 40A.

Referring again to FIGS. 1 and 2, the second winding 50 comprises an inner winding section 50A and an outer winding section 50B. The inner and outer winding sections 50A and 50B respectively of the second winding 50 each include a plurality of layers, each of said layers having a plurality of cylindrically wound turns of a conductor 65, the conductor 65 being coated or covered with a suitable insulation, such as an insulating enamel. The first layer of turns of the inner winding section 50A of the winding 50 is cylindrically wound directly adjacent to the winding-to-winding insulation 64. The first layer of insulation 57 is spirally wound between the adjacent layers of the turns which comprise the inner and outer winding sections 50A and 50B respectively of the winding 50. An insulating member 74 is disposed between the inner and the outer winding sections 50A and 50B respectively of the second winding 50 and comprises a plurality of spirally wound turns of the first layer of insulation 57. Separate insulating collar members 68, preferably corrugated and made from a suitable insulating material such as pressboard, may be also spirally wound between the adjacent layers of the turns which make up the inner and outer portions 50A and 50B respectively of the winding 50 in order to provide additional creep insulation between the adjacent layers of the winding 50 and to provide or maintain proper spacing between the adjacent layers of the winding 50. In order to provide for more efficient cooling of the second winding 50, the inner and outer winding sections 50A and 50B respectively are each provided with a plurality of duct-forming or spacing members 56 and 66 respectively disposed in spaced relationship at the ends of the winding 50 between adjacent layers of the turns which make up the inner and outer winding sections 50A and 50B respectively. The second winding 50 would also be provided with suitable lead means (not shown) which would be connected to the conductor 65, which may be of the strap form, from which the inner and outer winding sections 50A and 50B are formed or wound.

In order to insulate the second winding 50 from the second or outer winding section 40B of the first winding 40, an insulating member 84 is disposed between the second winding 50 and the second winding section 40B of the first winding 40. The insulating member 84 comprises a plurality of spirally wound turns of a second layer of insulation 157 which is wound directly over the outermost layer of the turns which comprise the outer winding section 50B of the second winding 50.

The second winding section 40B of the first winding 40 is similar to the first winding section 40A and comprises an inner winding portion 40BA and an outer winding 40BB. The inner and outer winding portions 40BA and 40BB of the second winding section 40B each comprise a plurality of turns of a conducting sheet or strip material 155 spirally wound together with a second layer of insulation 157. Similar to the first winding section 40A, the inner and outer winding portions 40BA and 40BB respectively may also include the insulating collar members 178 at the edges of the turns which comprise said winding portions in order to provide proper spacing and additional creepage insulation between adjacent turns of the second winding section 40B. An insulation 88 in a suitable form, such as an insulating tape, is provided or wrapped about the outside of the second winding section 40B adjacent to the outermost turns of the second winding section 40B. In order to provide insulation between the inner and outer winding portions 40BA and 40BB of the second winding section 40B, an insulating member 94 is disposed between the inner and outer winding portions 40BA and 40BB respectively, and comprises a plurality of spirally wound turns of the second layer of insulation 157.

Similar to the first winding section 40A of the first winding 40, lead means are provided for the inner and outer winding portions 40BA and 40BB respectively of the second winding section 40B. A starting lead 134 is brazed or connected to the inner end or turn of the conducting sheet material 155 from which the inner winding portion 40BA of the second winding section 40B is wound. A finish lead 112 is brazed or connected to the outer end or turn of the inner winding portion 40BA of the second winding section 40B. Similarly, a start lead 122 and a finish lead 114 are brazed or connected to the inner and outer ends or turns respectively of the outer winding portion 40BB of the second winding section 40B of the first winding 40.

The finish lead 132 of the inner winding portion 40AA of the first winding section 40A is brazed or connected to the starting lead 134 of the inner winding portion 40BA of the second winding section 40B as indicated at 135. The finish lead 124 of the outer winding portion 40AB of the first winding section 40A is connected to the starting lead 122 of the outer winding portion 40BB of the second winding section 40B as indicated at 145 for reasons which will be explained hereinafter.

Figures 3, 4, 5:
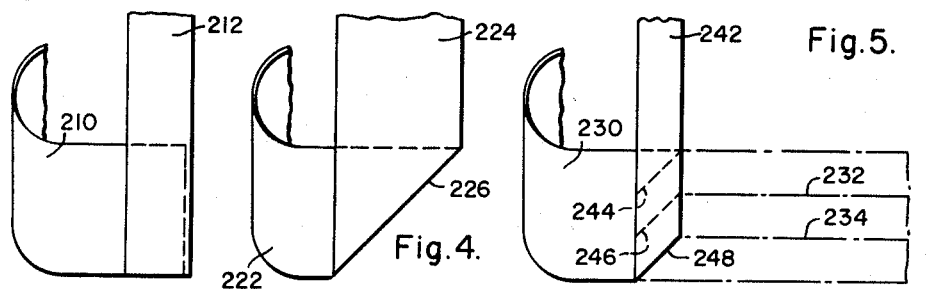
FIGS. 3, 4 and 5 are fragmentary views showing the manner in which the lead connections may be made to one of the windings of the core and coil assembly shown in FIG. 1.

Referring to FIGS. 3, 4 and 5, there are illustrated various methods and types of construction which may be used for the starting leads and the finishing leads associated with the first winding section 40A and the second winding section 40B of the first winding 40. Referring to FIG. 3, a known lead construction is illustrated in which a lead conductor 212, which is illustrated as rectangular in shape, is brazed or connected to the conducting strip or sheet material 210 from which the turns of a winding in accordance with this invention is formed. Referring to FIG. 4, a lead means in accordance with this invention is illustrated in which a lead conductor 224 is formed by diagonally folding or bending a portion of the conducting strip or sheet material 222 along the line 226 to form a lead which extends outwardly from a winding including a plurality of turns formed from the conducting sheet material 222. The width of the lead conductor 224 so formed would therefore be the same as the width of the conducting sheet material 222. Referring to FIG. 5, there is illustrated a lead construction in which the width of the lead conductor is less than the width of the associated conducting sheet material. A portion of the conducting sheet material 230 shown in FIG. 5 is cut or slit along a plurality of lines as indicated at 232 or 234. Each of the separate conducting strips so formed is bent or folded diagonally as indicated at 244, 246 and 248, respectively to form a lead conductor 242 having a width that is less than the width of the conducting sheet material 230 from which the turns of a winding, such as the winding sections 40A and 40B may be formed.

A preferred method of construction of the first and second winding sections 40A and 40B respectively of the first winding 40 and the second winding 50 in a unitary winding assembly is disclosed and claimed in a copending application of Merrill G. Leonard et al., Serial No. 654,782, filed April 24, 1957, now Patent 3,071,845, and assigned to the assignee of the present application. As more fully disclosed in that application, the first and second layers of insulation 57 and 157 respectively included in the winding sections 40A and 40B and the second winding 50 and included in the insulating members 54, 64, 74, 84 and 94 are coated at least in part with a thermosetting resin, such as various types of well known epoxy resins, before the said layers of insulation are assembled into a unitary winding assembly which would include the winding sections 40A and 40B and the second winding 50. The unitary winding assembly is then treated by a suitable means, such as heat for a predetermined time interval, to cure the thermosetting resin and to bond the winding sections 40A and 40B, the second winding 50 and the supporting member 44 together into a unitary assembly. The latter construction eliminates the need for dipping the separate windings into a suitable insulating varnish and then assembling them. This construction also substantially eliminates the possibility of entrapment or encapsulating air bubbles which might later cause insulation failure in a conventional construction.

Figure 6:
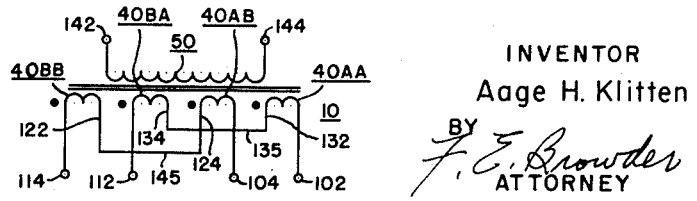
FIG. 6 is a simplified schematic diagram of the core and coil assembly shown in FIG. 1.

Referring to FIG. 6, the operation of the transformer core and coil assembly 10 shown in FIG. 1 is more readily understood by referring to the schematic diagram shown. The second winding 50 is connected to terminals 142 and 144. Separate terminals (not shown) may also be connected to the other ends of the inner and outer winding sections 50A and 50B respectively of the second winding 50. As explained previously, the starting lead 102 is connected to one side of the inner winding portion 40AA of the first winding section 40A. The other end of the inner winding portion 40AA of the first winding section 40A is connected through the finish lead 132 to one end of the inner winding portion 40BA of the second winding section 40A at the start lead 134 through the brazed connection 135. The other end of the inner winding portion 40BA of the second winding section 40B is connected to the finish lead 112. In similar fashion, the start lead 104 is connected to one end of the outer winding portion 40AB of the first winding section 40A. The outer end of the outer winding portion 40AB of the first winding section 40A is connected through the finish lead 124 to one end of the outer winding portion 40BB of the second winding section 40B at the start lead 122 through the brazed connection 145. The other end of the outer winding portion 40BB of the second winding section 40B is connected to the finish lead 114. The electrical connections just described are suitable for a series-multiple connection of the first and second winding sections 40A and 40B respectively of the first winding 40. For a series connection of the first and second winding sections 40A and 40B respectively, the leads 104 and 112 can be connected by a conductor (not shown). For a parallel connection of the first and second winding sections 40A and 40B respectively, the leads 102 and 104 are connected by a conductor (not shown) and the leads 112 and 114 are connected together by a conductor (not shown). By dividing the first and second winding sections 40A and 40B respectively into inner and outer winding portions, the connections provide an interleaved construction to reduce circulating currents and to substantially equalize or balance the magnetic coupling between the different winding portions of the first and second winding sections 40A and 40B respectively and the second winding 50. In operation, the second winding 50 would be connected under normal operating conditions to a source of alternating current voltage (not shown) and the winding sections 40A and 40B of the first winding would be connected to a load circuit (not shown).

It is to be understood that shielding means of various conventional or well-known types, including foil conducting material, may be provided in a winding construction as disclosed to increase the surge capacity of the windings or to decrease the capacity between certain windings and ground. In addition, it is to be understood that the duct-forming or spacing members may be varied in a particular application to provide the required cooling of the windings as disclosed.

The apparatus embodying the teachings of this invention has several advantages. For example, it has been found that a core and coil assembly including a winding construction as disclosed is more compact and lighter in weight. In addition, the mechanical strength of the preferred unitary winding assembly including a winding formed from conducting sheet material as disclosed is greater than that of the assembled windings in a conventional construction. The resistance of the winding assembly to short circuit stresses is also increased since the electrical centers of the different windings lie in the same plane, thus substantially eliminating the forces at the boundaries between the different windings which tend to separate the windings under short circuit conditions. External coil or winding bracing may not even be required in particular applications because of the greater mechanical strength of the preferred unitary winding assembly as disclosed. In addition, eddy current losses are reduced in the winding whose turns are formed from the conducting sheet material as disclosed without a corresponding increase in losses or disadvantages due to skin effect. Further, the lead connections as disclosed, may be employed to substantially eliminate brazing of the lead connections and to provide a more compact construction. Finally, the winding construction as disclosed, in combination with the preferred construction for bonding the different windings together into a unitary winding assembly is uniquely adapted to take advantage of the teachings of this invention in order to provide a more compact electrical inductive apparatus, such as a transformer, having a lower weight. The latter advantage is particularly important for transformers required for pole mounting.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A transformer comprising a magnetic core, a first winding inductively disposed on said core, said first winding comprising first and second winding sections each including a plurality of turns of conducting strip material spirally wound together with a first layer of insulation, a second winding inductively disposed intermediate the first and second winding sections of said first winding, said second winding comprising a plurality of layers each including a plurality of cylindrically wound turns of a conductor having a coating of insulation thereon, a second layer of insulation disposed between the adjacent layers of turns of said second winding, said first and second layers of insulation being coated at least in part with an epoxy resin to bond said windings together in a unitary winding assembly, lead means secured to the first and second winding sections of said first winding, and the electrical center lines of said first and second windings lying in the same plane thereby increasing the resistance of the winding assembly to short circuit stress.

2. A transformer comprising a magnetic core, a first winding inductively disposed on said core, said first winding comprising inner and outer winding sections each including a plurality of turns of conducting strip material spirally wound together with a first layer of insulation, a supporting member disposed between said inner winding section and said core, said supporting member comprising a plurality of spirally wound turns of said first layer of insulation, a second winding inductively disposed intermediate the first and second winding sections of said first winding, said second winding comprising a plurality of layers each including a plurality of cylindrically wound turns of a conductor having a covering of insulation, a second layer of insulation disposed between the adjacent layers of turns of said second winding, said first and second layers of insulation being coated at least in part with a thermosetting resin, said resin bonding said first and second windings and said supporting member in a unitary winding assembly, lead means secured to the first and second winding sections of said first winding, and the electrical center lines of said first and second windings lying in the same plane thereby increasing the resistance of the winding assembly to short circuit stresses.

3. A transformer comprising a magnetic core, a first winding inductively disposed on said core, said first winding comprising inner and outer winding sections each including a plurality of turns of conducting strip material spirally wound together with a first layer of sheet insulation, a supporting member disposed between said inner winding section and said core, said supporting member comprising a plurality of spirally wound turns of said first layer of insulation, a second winding inductively disposed intermediate the first and second winding sections of said first winding, said second winding comprising a plurality of layers each including a plurality of cylindrically wound turns of a conductor having a covering of insulation, a second layer of sheet insulation disposed between the adjacent layers of turns of said second winding, first and second insulating members disposed between said second winding and said first and second winding sections, respectively, to provide winding to winding insulation, said first and second insulating members comprising a plurality of turns of said first and second layers of insulation, respectively, said first and second layers of insulation being coated at least in part with a thermosetting resin, said resin bonding said first and second windings and said supporting member in a unitary winding assembly, lead means secured to the first and second winding sections of said first winding, and the electrical center lines of said first and second windings lying in the same plane thereby increasing the resistance of the winding assembly to short circuit stresses.

References Cited in the file of this patent

UNITED STATES PATENTS

| | | |
|---|---|---|
| 1,992,814 | Cooney | Feb. 26, 1935 |
| 2,087,475 | Halperin et al. | July 20, 1937 |
| 2,608,089 | Raymond et al. | Aug. 26, 1952 |
| 2,713,667 | Schwennesen | July 19, 1955 |
| 2,780,742 | Jenner et al. | Feb. 5, 1957 |
| 2,863,130 | Gray et al. | Dec. 2, 1958 |
| 2,874,360 | Eisler | Feb. 17, 1959 |
| 2,942,217 | Ford | June 21, 1960 |